United States Patent
Goldberg et al.

(10) Patent No.: US 7,948,375 B2
(45) Date of Patent: May 24, 2011

(54) METHOD AND APPARATUS FOR DETECTING PORTABLE ELECTRONIC DEVICE FUNCTIONALITY

(75) Inventors: Steven Jeffrey Goldberg, Downingtown, PA (US); John Thommana, Cedar Rapids, IA (US); Arty Chandra, Manhasset Hills, NY (US); Alain Charles Louis Briancon, Poolesville, MD (US)

(73) Assignee: InterDigital Technology Corporation, Wilmington, DE (US)

( * ) Notice: Subject to any disclaimer, the term of this patent is extended or adjusted under 35 U.S.C. 154(b) by 485 days.

(21) Appl. No.: 11/294,957

(22) Filed: Dec. 6, 2005

(65) Prior Publication Data

US 2006/0172063 A1 Aug. 3, 2006

Related U.S. Application Data

(60) Provisional application No. 60/633,527, filed on Dec. 6, 2004.

(51) Int. Cl.
G08B 21/00 (2006.01)
(52) U.S. Cl. .................. 340/540; 340/506; 340/691.1; 340/691.6; 340/693.5
(58) Field of Classification Search .................. 340/506, 340/540, 691.1, 691.6, 693.5, 321
See application file for complete search history.

(56) References Cited

U.S. PATENT DOCUMENTS

| | | | |
|---|---|---|---|
| 4,084,891 A | 4/1978 | Kiefer | |
| 4,473,285 A | 9/1984 | Winter | |
| 4,490,814 A | 12/1984 | Shenk | |
| 4,531,822 A | 7/1985 | Shenk | |
| 4,980,671 A | 12/1990 | McCurdy | |
| 5,778,304 A | 7/1998 | Grube et al. | |
| 5,790,074 A | 8/1998 | Rangedahl et al. | |
| 5,793,477 A | 8/1998 | Laakmann | |
| 5,848,161 A | 12/1998 | Luneau et al. | |
| 5,960,081 A | 9/1999 | Vynne et al. | |
| 6,018,374 A | 1/2000 | Wrobleski | |
| 6,028,626 A | 2/2000 | Aviv | |

(Continued)

FOREIGN PATENT DOCUMENTS

EP  0 505 266  3/1992

(Continued)

OTHER PUBLICATIONS

Mobasseri, "Exploring CDMA for Watermarking of Digital Video", Security and Watermarking of Multimedia Contents, Electronic Imaging'99, San Jose, Jan. 23-29, 1999.

(Continued)

*Primary Examiner* — Daryl Pope
(74) *Attorney, Agent, or Firm* — Volpe and Koenig, P.C.

(57) ABSTRACT

The present invention is a method and apparatus for the detection of portable electronic device functionality. In a preferred embodiment, the present invention includes a chemically coated antenna to serve as a trigger for device functionality detection. The chemically coated antenna may be passively or actively detected. In active detection, a detection apparatus releases a chemical which reacts or otherwise respods with the chemical trigger in a detectable manner. The detection apparatus detects the reaction, which is specific to the functionality of the portable electronic device. In passive detection, a detection device simply detects the chemical trigger, which is specific to the portable electronic device functionality. Other trigger embodiments utilizing optics, radio frequency (RF) signals, sound waves, and magnetic identification are also disclosed.

27 Claims, 2 Drawing Sheets

U.S. PATENT DOCUMENTS

| | | | |
|---|---|---|---|
| 6,034,726 | A | 3/2000 | Hirota et al. |
| 6,035,341 | A | 3/2000 | Nunally et al. |
| 6,111,364 | A | 8/2000 | Davis et al. |
| 6,189,146 | B1 | 2/2001 | Misra et al. |
| 6,195,772 | B1 | 2/2001 | Mielke et al. |
| 6,208,379 | B1 | 3/2001 | Oya et al. |
| 6,266,541 | B1 | 7/2001 | Noda |
| 6,343,213 | B1 | 1/2002 | Steer et al. |
| 6,353,778 | B1 | 3/2002 | Brown |
| 6,393,254 | B1 | 5/2002 | Pousada et al. |
| 6,396,399 | B1 | 5/2002 | Dunlap |
| 6,424,370 | B1 | 7/2002 | Courtney |
| 6,441,731 | B1 | 8/2002 | Hess |
| 6,477,649 | B2 | 11/2002 | Kambayashi et al. |
| 6,529,600 | B1 | 3/2003 | Epstein et al. |
| 6,559,883 | B1 | 5/2003 | Fancher et al. |
| 6,591,096 | B2 | 7/2003 | Ezuriko |
| 6,625,455 | B1 | 9/2003 | Ariga |
| 6,662,023 | B1 | 12/2003 | Helle |
| 6,677,858 | B1 | 1/2004 | Faris et al. |
| 6,687,497 | B1 | 2/2004 | Parvulescu et al. |
| 6,696,948 | B2 | 2/2004 | Thompson et al. |
| 6,711,004 | B2 | 3/2004 | Yen et al. |
| 6,738,572 | B2 | 5/2004 | Hunter |
| 6,771,946 | B1 | 8/2004 | Oyaski |
| 6,832,093 | B1 | 12/2004 | Ranta |
| 6,868,229 | B2 | 3/2005 | Balogh |
| 6,922,524 | B2 | 7/2005 | Sato |
| 7,006,630 | B2 | 2/2006 | Yu et al. |
| 7,088,016 | B2 * | 8/2006 | Hattori .................... 307/139 |
| 7,088,347 | B2 * | 8/2006 | Iisaka et al. ............... 345/177 |
| 7,103,369 | B2 | 9/2006 | Sato et al. |
| 7,159,116 | B2 | 1/2007 | Moskowitz |
| 7,190,808 | B2 | 3/2007 | Goldberg et al. |
| 2001/0031631 | A1 | 10/2001 | Pitts |
| 2001/0041590 | A1 | 11/2001 | Silberfenig et al. |
| 2001/0049275 | A1 | 12/2001 | Pierry et al. |
| 2002/0030744 | A1 | 3/2002 | Sawachi |
| 2002/0039896 | A1 | 4/2002 | Brown |
| 2002/0055361 | A1 | 5/2002 | McDonnell et al. |
| 2002/0058497 | A1 | 5/2002 | Jeong |
| 2002/0076084 | A1 | 6/2002 | Tian et al. |
| 2002/0107032 | A1 | 8/2002 | Agness et al. |
| 2002/0177451 | A1 | 11/2002 | Ogasawara |
| 2002/0183896 | A1 | 12/2002 | Ogure et al. |
| 2002/0186845 | A1 | 12/2002 | Dutta et al. |
| 2002/0191102 | A1 | 12/2002 | Yuyama et al. |
| 2003/0037237 | A1 | 2/2003 | Abgrall et al. |
| 2003/0067392 | A1 | 4/2003 | Monroe |
| 2003/0078076 | A1 | 4/2003 | Kuwajima et al. |
| 2003/0079166 | A1 | 4/2003 | Vermeulen et al. |
| 2003/0122671 | A1 | 7/2003 | Jespersen |
| 2003/0132880 | A1 | 7/2003 | Hintz |
| 2003/0133573 | A1 | 7/2003 | Himmel et al. |
| 2003/0143992 | A1 | 7/2003 | Humphrey et al. |
| 2003/0149973 | A1 | 8/2003 | Kerlefsen |
| 2003/0169342 | A1 | 9/2003 | Steinberg et al. |
| 2003/0179881 | A1 | 9/2003 | Nicolas |
| 2003/0184944 | A1 * | 10/2003 | Hattori .................... 361/115 |
| 2003/0191848 | A1 | 10/2003 | Hesselink et al. |
| 2003/0212903 | A1 | 11/2003 | Porras et al. |
| 2003/0215010 | A1 | 11/2003 | Kashiwa |
| 2003/0219231 | A1 | 11/2003 | Vernon |
| 2003/0233410 | A1 | 12/2003 | Gusler et al. |
| 2003/0235175 | A1 | 12/2003 | Naghian et al. |
| 2004/0029560 | A1 | 2/2004 | Ariga |
| 2004/0046871 | A1 | 3/2004 | Ichikawa et al. |
| 2004/0051853 | A1 | 3/2004 | Nishida et al. |
| 2004/0075948 | A1 | 4/2004 | Kuwajima et al. |
| 2004/0086089 | A1 | 5/2004 | Naidoo et al. |
| 2004/0104844 | A1 | 6/2004 | Rooyen et al. |
| 2004/0109081 | A1 | 6/2004 | Sumi |
| 2004/0110515 | A1 | 6/2004 | Blumberg et al. |
| 2004/0116128 | A1 | 6/2004 | Chen |
| 2004/0155969 | A1 | 8/2004 | Hayashi |
| 2004/0163118 | A1 | 8/2004 | Mottur |
| 2004/0178913 | A1 | 9/2004 | Penuela et al. |
| 2004/0198306 | A1 | 10/2004 | Singh et al. |
| 2004/0201784 | A9 | 10/2004 | Dagtas et al. |
| 2004/0203924 | A1 | 10/2004 | Chen |
| 2004/0204021 | A1 | 10/2004 | Cocita |
| 2005/0001024 | A1 | 1/2005 | Kusaka et al. |
| 2005/0002585 | A1 | 1/2005 | Brauckmann et al. |
| 2005/0007456 | A1 | 1/2005 | Lee et al. |
| 2005/0008324 | A1 | 1/2005 | Balogh |
| 2005/0039020 | A1 | 2/2005 | Levy |
| 2005/0041951 | A1 | 2/2005 | Inoue et al. |
| 2005/0043548 | A1 | 2/2005 | Cates |
| 2005/0057682 | A1 | 3/2005 | Staller |
| 2005/0073419 | A1 | 4/2005 | Gary, Jr. |
| 2005/0149334 | A1 | 7/2005 | Chen |
| 2005/0151669 | A1 | 7/2005 | Swallow |
| 2005/0210526 | A1 | 9/2005 | Levy et al. |
| 2005/0270859 | A1 | 12/2005 | Kato |
| 2006/0104483 | A1 | 5/2006 | Harel et al. |
| 2006/0148418 | A1 | 7/2006 | Purkayastha et al. |
| 2006/0159302 | A1 | 7/2006 | Goldberg et al. |
| 2007/0129012 | A1 | 6/2007 | Snow |

FOREIGN PATENT DOCUMENTS

| | | |
|---|---|---|
| EP | 0 830 046 | 3/1998 |
| EP | 1 130 500 | 9/2001 |
| EP | 1 139 684 | 10/2001 |
| EP | 1 172 270 | 1/2002 |
| EP | 1 182 901 | 2/2002 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 0 211 612 | 2/1927 |
| GB | 2 329 794 | 3/1999 |
| GB | 2 348 571 | 4/2000 |
| GB | 2 343 339 | 5/2000 |
| GB | 2 348 573 | 10/2000 |
| GB | 2348573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 2000332890 | 11/2000 |
| JP | 2001-116564 | 4/2001 |
| JP | 2001313006 | 11/2001 |
| JP | 2002044736 | 2/2002 |
| JP | 2002125267 | 4/2002 |
| JP | 2002159059 | 5/2002 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004242096 | 8/2004 |
| JP | 2004260631 | 9/2004 |
| JP | 2004260796 | 9/2004 |
| JP | 200503379 | 2/2005 |
| JP | 2005003379 | 2/2005 |
| WO | 98/34412 | 8/1998 |
| WO | 00/60556 | 10/2000 |
| WO | 02/103968 | 12/2002 |
| WO | 03/028342 | 4/2003 |
| WO | 03/040898 | 5/2003 |
| WO | 03/047207 | 6/2003 |
| WO | 2004/089021 | 4/2004 |
| WO | 2004/008902 | 10/2004 |
| WO | 2004/08902 | 10/2004 |
| WO | 2004/089021 | 10/2004 |
| WO | 2004/102313 | 11/2004 |

OTHER PUBLICATIONS

Sanzgiri et al., "A Secure Routing Protocol for Ad Hoc Networks", Proceedings of the $10^{th}$ IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10$^{th}$ IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10$^{th}$ IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10$^{th}$ IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

Mobasseri, "Exploring CDMA for Watermarking of Digital Video", Security and Watermarking of Multimedia Contents, Electronic Imaging'99, San Jose, Jan. 23-29, 1999.

Sanzgiri et al., "A Secure Routing Protocol for Ad Hoc Networks", Proceedings of the 10$^{th}$ IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

\* cited by examiner

METHOD AND APPARATUS FOR DETECTING PORTABLE ELECTRONIC DEVICE FUNCTIONALITY

CROSS REFERENCE TO RELATED APPLICATION

This application claims priority from U.S. Provisional Patent Application No. 60/633,527 filed Dec. 6, 2004, which is incorporated by reference as if fully set forth.

FIELD OF INVENTION

The present invention relates generally to portable electronic devices, and more particularly, to the detection of portable electronic device functionality.

BACKGROUND

Electronic Component Miniaturization is allowing functionality to be embedded in many devices that previously could not contain such functionality. Examples include cameras, microphones, and/or speakerphones, which were previously stand-alone devices, but are now typically embedded within devices such as telephones and mobile telephones, personal digital assistants (PDAs), and watches. Similarly, sound recording functionality can be embedded in virtually any device that it makes sense to do so. As a result of this hybridization, the functionality contained in a portable electronic device may not be readily apparent. Moreover, miniaturized sensing components may not be easily recognizable with just a cursory glance.

Wireless communication technologies, cameras, and voice and video recording devices, for example, are being incorporated into cellular telephones, laptop computers, and PDAs. These once simple communication tools are now complex communication devices that can be employed as spy mechanisms violating the personal rights, dignity, and freedom of other individuals.

Currently, devices with certain prohibited functionality are regulated by either posting restrictions in certain areas or by searching a person for such a device. There are also standalone radio beacon devices that inform portable electronic devices with integrated beacon receivers that the use of the specified functionality is prohibited in the vicinity of the beacon. The use of radio beacons has not yet gained widespread popularity due to the fact that beacon reception can be blocked, additional hardware (not in-line with the cellular hardware roadmap) must be incorporated into the portable electronic device, and because beacons are a binary regulation approach, i.e., an all or nothing regulation technique.

Manual inspections may also be used to detect the functionality of portable electronic devices. Manual inspection, however, is a cumbersome and tiresome process, especially in crowded, fast moving areas. An inspector, must be trained in the process of embedded device identification, especially since manufacturers are continuously finding novel ways to discreetly add new functionality to portable electronic devices. The diminishing size and integration of sensing components with other non-threatening devices makes the presence of sensing components difficult to identify, even to trained inspectors. Compounding the task of inspectors is that devices are frequently embedded with dummy replicas of components that a manufacturer may be planning to embed at some future time. This causes false identification.

If the presence of these sensing components can be made known, a deterrent for specific violations can be created. Accordingly, there is a need for detecting the functionality of portable electronic devices to prevent the use of prohibited functionality in designated areas.

SUMMARY

The present invention is a method and apparatus for the detection of portable electronic device functionality. In a preferred embodiment, the present invention includes a chemically coated antenna to serve as a trigger for device functionality detection. The chemically coated antenna may be passively or actively detected. In active detection, a detection apparatus releases a chemical which reacts with the chemical trigger in a detectable manner. The detection apparatus detects the reaction, which is specific to the functionality of the portable electronic device. In passive detection, a detection device simply detects the chemical trigger, which is specific to the portable electronic device functionality. Other trigger embodiments utilizing optics, radio frequency (RF) signals, sound waves, and magnetic identification are also disclosed.

BRIEF DESCRIPTION OF THE DRAWINGS

A more detailed understanding of the invention may be had from the following description of preferred embodiments, given by way of example and to be understood in conjunction with the accompanying drawing wherein.

DETAILED DESCRIPTION OF THE PREFERRED EMBODIMENTS

The present invention discloses a system and method for detecting the presence of embedded functionality of typical portable electronic devices. Typical portable electronic devices include, but are not limited to, cell phones, smart phones, pagers, digital cameras, digital video cameras, MP3 players, digital sound recorders, and other electronic devices that are capable of being implemented in a portable electronic device. Typical functionality of portable electronic devices includes, but is not limited to, mobile telephone functionality, still camera functionality, voice recording functionality, audio playback (such as MP3) functionality, video camera functionality, bar code reading functionality, RFID scanning functionality, Bluetooth wireless networking functionality, and various other functionality that is capable of being implemented in a portable electronic device. Functionality not inherent in the portable electronic device may be added to the portable electronic device by way of an external device. For example, a mobile phone may not inherently include camera functionality, but a peripheral device that plugs into the mobile phone may result in the mobile phone having camera functionality. The universal serial bus (USB) interface is an example of a physical connection that would allow this type of peripheral functionality, and Bluetooth and iRDA are non-physical connection examples. Various types of connections may also be used to add functionality in a handheld fashion to a non handheld device such as a personal computer. It should be understood that the above mentioned examples of both portable electronic devices and typical functionality incorporated therein are merely exemplary, and in no way limit the scope of the present invention.

Figure 1:
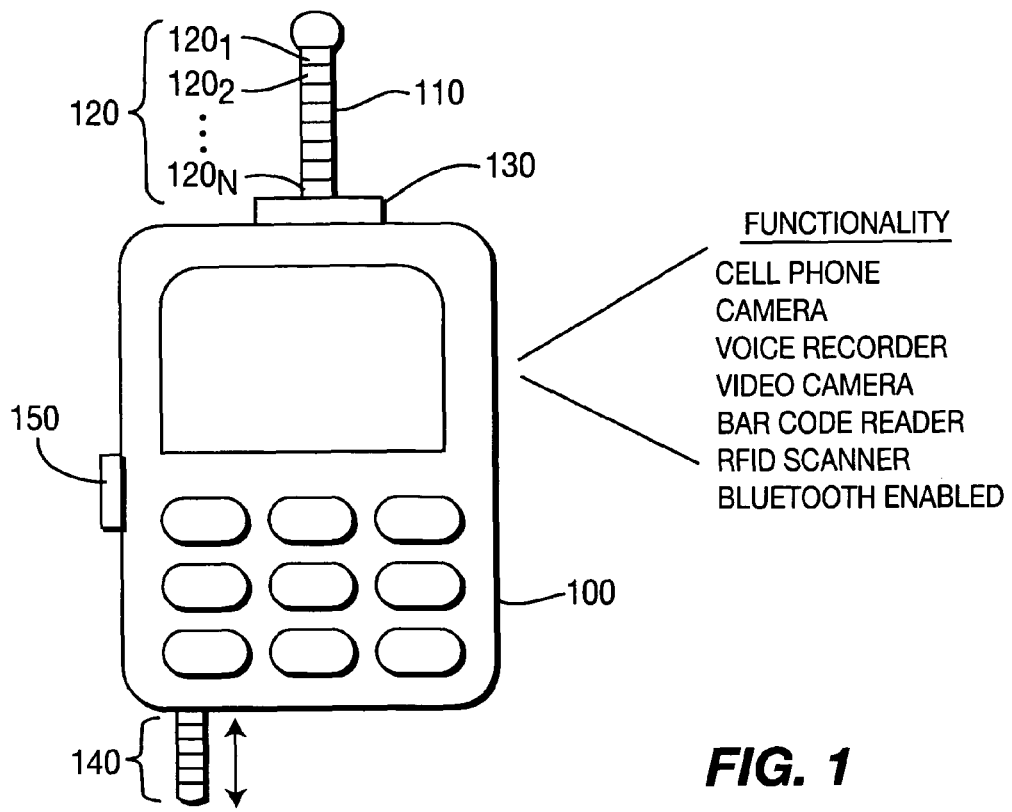
FIG. 1 is a portable electronic device with a chemically coated antenna to serve as a trigger for portable electronic device functionality detection and, alternatively a retractable chemical coated functionality trigger.

FIG. 1 shows a portable electronic device 100. It should be understood that while the portable electronic device 100 is depicted as a wireless transmit/receive unit (WTRU) generally, and specifically a mobile telephone, this is exemplary and is not intended to limit the scope of the present invention. The portable electronic device 100 contains functionality that allows it to operate as a cell phone, a camera, a voice recorder, a video recorder, a bar code reader, an RFID scanner, and is Bluetooth enabled. Additional functionality in various combinations may be provided in the electronic device 100 or added as a peripheral device, and the functionality contained in the electronic device 100 is again exemplary.

The portable electronic device 100 has an antenna 110. The antenna 110 transmits radio frequency signals to various other WTRUs or other wireless communication equipment, and may be utilized in the implementation of functionality inherent in the portable electronic device 100. The antenna 110 is coated with a chemical substance in various layers $120_1, 120_2 \ldots 120_N$, generally designated 120. The chemical substance is generally inert in typical operating environments.

In a first embodiment of the present invention, the chemical layers 120 are selected such that they are passively detectable. Various technologies exist that are capable of detecting small quantities of a given chemical or particulate in the atmosphere. For example, mass spectrometry is capable of detecting the presence given chemical in concentrations as small as one part per billion. Various other detectors are commonly used in airports to screen luggage for explosive residues. The chemical layers 120 of the chemical antenna 110 are selected in varying concentrations or composition such that the functionality of a portable electronic device may be identified by the passive detection of the chemical layers 120. For example, a relatively high concentration of the chemical layers 120 may indicate the portable electronic device 100 contains camera functionality, while a relatively low concentration indicates no camera functionality is present.

In a second embodiment of the present invention, the chemically coated antenna 110 is actively detected when it reacts with select chemicals that are not typically present in natural operating environments. Upon exposure to the reactive compound (herein referred to as the activator, and these terms are used interchangeably), the chemical layers 120 react in a detectable manner. For example, the chemical layers 120 could exhibit a color change. Alternatively, the chemical layers 120 could glow, emit heat, or emit a chemical reaction byproduct, for example a liquid or a gas, which is detectable. It should be noted by one skilled in the art that various chemical layers and activators could be used that produce a variety of detectable reactions.

Based upon the functionality of the portable electronic device 100, the detectable reaction will have a predetermined signature. In other words, the detectable reaction will contain information relating to the functionality of the portable electronic device 100. For example, if the portable electronic device contains camera functionality, a black chemical layered antenna will turn red upon contact with the activating chemical. This can be achieved in a variety of ways, specific to the chemical components comprising the chemical layers 120 and the chemical activator. For example, the concentration of the chemical layer may be modified based on the functionality of the portable electronic device 100. A higher concentration of a constituent chemical in the chemical layers 120 may produce a more intense reaction upon activation, for example.

In the case where the chemical layers 120 are consumed by either passive or active detection, the antenna 110 is replaceable. An antenna identifier 130 is incorporated into the portable electronic device to ensure a replacement antenna has the appropriate chemical layering wherein the functionality of the portable electronic device may be identified upon being detected. For example, the antenna identifier 130 may mate with the antenna 110 in a selected orientation, or the antenna 110 may be keyed so as to properly mate with the antenna identifier 130, thereby allowing only the antenna 110 with the correct configuration to be inserted into an antenna identifier 130. It should be noted by one skilled in the art that various other methods for ensuring the proper antenna is selected for a given portable electronic device. Additionally, the portable electronic device could include a sensor that verifies the chemical layers 120 are present in sufficient concentration to be detected. If the sensed concentration of the chemical layers 120 falls below a predetermined acceptable level, the portable electronic device 100 may deactivate itself and/or the user may be alerted to the condition. Upon restoration of an acceptable level of sensed concentration of the chemical layer, usage of the portable electronic device 100 is restored.

Alternatively, a retractable testing strip 140 may be coated with a chemical layer. This may be particularly desirable when the portable electronic device 100 is not a wireless communications device, and thus has no requirement for an antenna. In a preferred embodiment, the retractable strip 140 may by extended from the portable electronic device 100 by depressing the button 150. The retractable strip 140 may be retracted into the portable electronic device 100 by again depressing the button 150. Alternatively, the retractable strip 140 may be extended and retracted by a key sequence or combination of key strokes. The retractable nature of the retractable strip 140 allows the functionality identifying chemical layering to be discreetly hidden when the portable electronic device 100 is in normal use.

Alternatively, replaceable skins for portable electronic devices may also be used as a carrier for the chemical layer 120. Small replaceable surface areas on the body of the device may also be used as a carrier for the chemical layer 120.

In another embodiment of the present invention, optics may be used to detect the functionality of a portable electronic device. An antenna may serve as an optical identifier by filtering out certain wavelengths of light corresponding to functionality of the portable electronic device. An optical sensor may identify the filtered wavelengths and thereby identify the functionality contained in the portable electronic device.

In another embodiment of the present invention, radio frequency (RF) signals are used to detect the functionality of a portable electronic device. In active RF identification, the device will emit a low power device functionality identification signal at specific intervals of time. Variations in signal characteristics, for example, frequency variations, phase variations, or a combination of parameter variations, may be used to identify the functionality of a device transmitting the RF signals. Alternatively, passive RF identification may be used. In passive RF identification, the portable electronic device emits an RF signal in response to a request. Upon receiving the request, the portable electronic device sends a low power response signal wherein variations in signal characteristics may be used to identify the functionality of the portable electronic device.

In another embodiment of the present invention, sound waves are used to detect the functionality of a portable electronic device. In an active embodiment, the portable electronic device emits a sound wave above or below the audible range of human hearing. Using various modulation techniques, such as, for example, frequency modulation or amplitude modulation, the sound wave is modulated to encode information pertaining to the functionality of the portable electronic device. In a passive embodiment, the portable electronic device emits a functionality identifying sound only in response to a request.

In another embodiment of the present invention, terahertz signals (RF signals with a frequency of trillions of cycles per second) are used to detect the functionality of portable electronic devices. In this embodiment, the manufacturers of portable electronic devices embed chemical signatures into the circuit boards of the devices. The chemical signatures relate to the functionality of the portable electronic device. Terahertz signal spectrometry is used to detect these chemical signatures and in turn the functionality of the portable electronic device.

In another embodiment of the present invention, the portable electronic device is outfitted with a magnetic matrix symbol identifier. The magnetic matrix symbol identifier contains information relating to the functionality of the portable electronic device. The information is stored in a magnetic matrix on the surface of a portable electronic device. A magnetic matrix symbol identifier reader is utilized to read the information contained in the magnetic matrix symbol using magneto-optical imaging technology. Magnetic matrix readers are known in the art and can detect and read magnetic matrix identification symbols that are covered with a variety of materials, including up to 15 mils of paint. Detecting functionality in this manner is inexpensive, and can be utilized even if popular cell phone covers and skins are in place.

Figure 2:
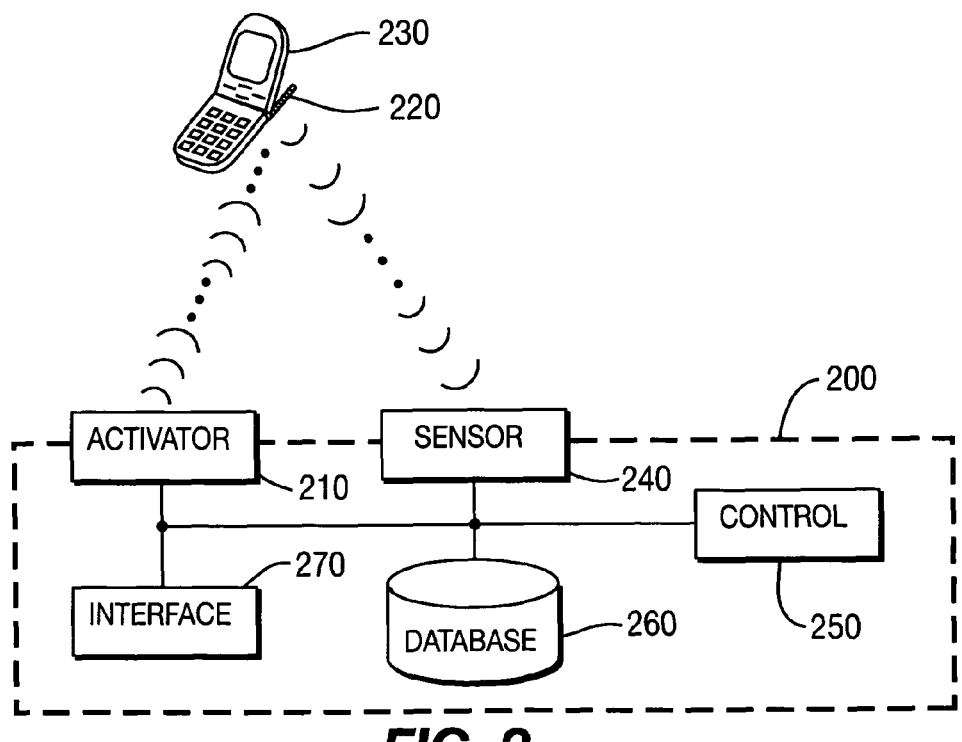
FIG. 2 is a block diagram of a system for detecting the functionality of a portable electronic device.

Referring to FIG. 2, a block diagram of an apparatus 200 for detecting the functionality of a portable electronic device is shown. The apparatus 200 detects the functionality of portable electronic devices, such as mobile phone 230, by activating a trigger 220 for electronic device functionality identification which is part of the portable electronic device, and sensing the trigger.

The activator 210 may activate the trigger 220 in a variety of ways, depending on the nature of the trigger. Where the trigger is a plurality of chemical layers 120 on an antenna 110 as disclosed above, the activator releases a chemical into the environment surrounding the mobile phone 230. A sensor detects the activation of the trigger 220 by sensing, in this case, the chemical reaction. Where the chemical reaction produces a light signature, the sensor 240 is a light sensor. Where the chemical reaction produces a heat signature corresponding to the functionality of the mobile phone 230, the sensor 240 is a heat sensor. Where the trigger 220 is an optical antenna, the activator 210 is a light source of a given wavelength or combination of wavelengths, and the sensor 240 is a light sensor.

Alternatively, the sensor 240 of the apparatus 200 may be eliminated altogether. When the activation of the trigger 220 results in the trigger 220 exhibiting a property that is detectable by an operator, such as, for example, a color change of the trigger 220, the sensor of the apparatus 200 may be eliminated. In this manner, an operator of the apparatus may place the portable electronic device 230 in the appropriate proximity to the apparatus 200, activate the apparatus 200, and observe the trigger.

The apparatus 200 further includes a database 260 for storing information relating triggers 220 with portable device functionality. An optional interface 270 conveys the detected functionality of a portable electronic device to a user of the apparatus. A controller 250 controls the operation of the device. It should be noted by one of ordinary skill in the art that the apparatus 200 may contain more or less components in any combination as desired.

In another embodiment of the present invention, a radar scanning device is utilized to determine the functionality of a portable electronic device. Holographic imaging radar that generates 360-degree images is known in the art. This technology can detect the presence of devices concealed in someone's clothing, luggage, briefcase, backpack, pocketbook, or the like.

The image created by the holographic radar is analyzed to detect the presence and functionality of a portable electronic device. This analysis may be performed by a human operator of the radar imaging machine or may be automated using artificial intelligence. When artificial intelligence is used, the machine may be programmed to detect the likely presence of a portable electronic device and a human operator of the machine is alerted.

The functionality of portable electronic devices scanned by the holographic imaging radar, or any of the other detection methods described herein, is not likely to be determined with 100% certainty. Therefore, whenever a particular functionality is detected, it is assigned a confidence factor value preferably using contiguous logic definitions. This is done to provide an indication of the likelihood that the detected functionality is in fact the prohibited and/or restricted functionality (i.e. a degree of confidence that the detected functionality is in fact the one being tested for.) For example, a detected functionality may be given a confidence factor of 0 if the detected functionality is not the functionality being tested for. A confidence factor of 0.7 may be assigned if the detected functionality is determined with a high degree of probability to be the functionality being tested for. A confidence factor of 1.0 may be assigned to a detected functionality that is undoubtedly the functionality being tested for. It should be understood by those skilled in the art that this rating system is exemplary, and does not limit the scope of the present invention.

Figure 3:
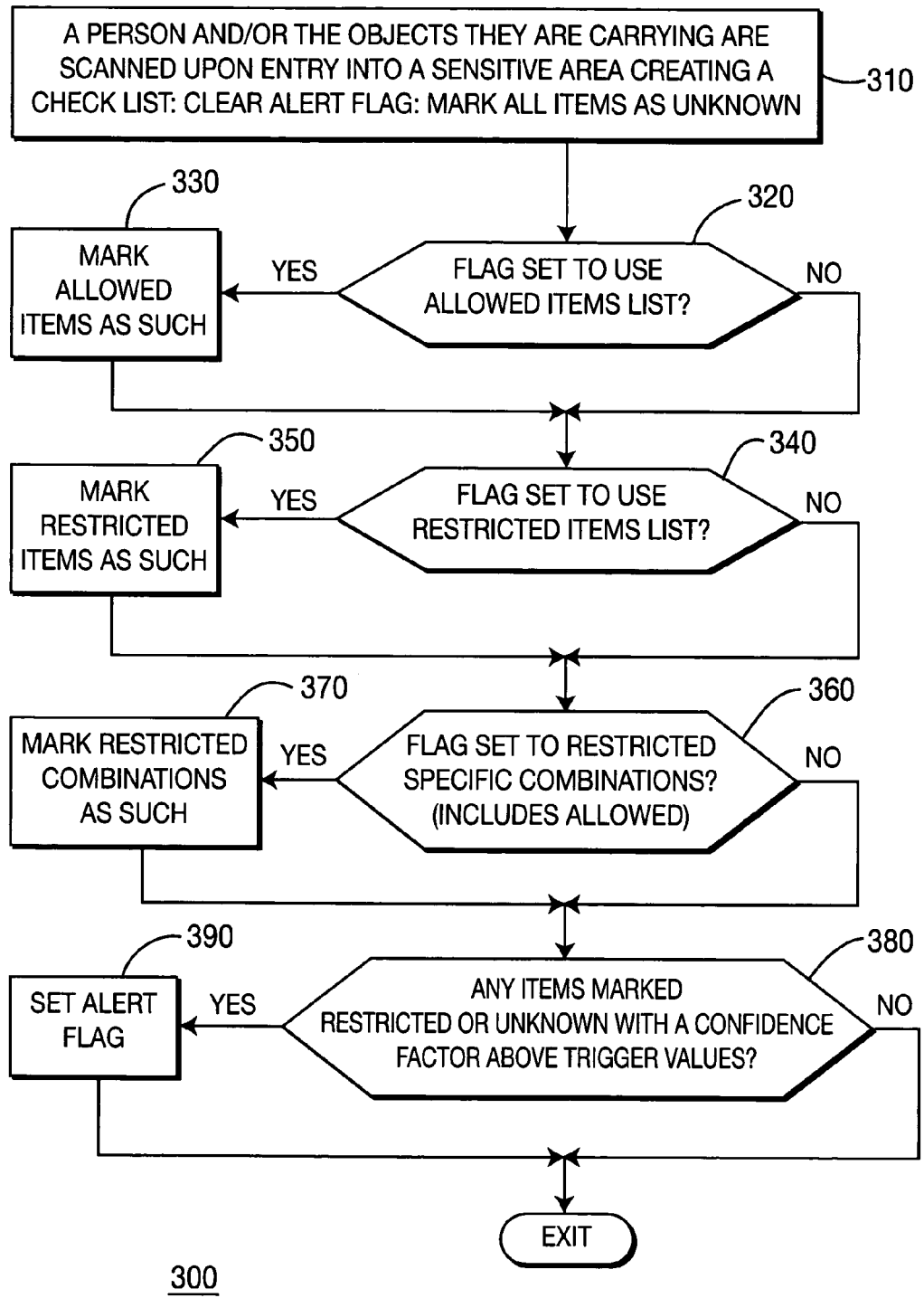
FIG. 3 is a flow chart of a method for identifying restricted functionality in a portable electronic device.

Referring to FIG. 3, a method 300 for identifying restricted device functionality using any of the portable electronic device functionality detection methods described above is shown. A person and/or the portable electronic device is scanned upon entry into a protected area creating a checklist (step 310). For each detected portable electronic device functionality, an entry in the checklist is created. The method then determines whether the functionality is allowed in the protected area (step 320). If the functionality is allowed in the protected area, a checklist flag is set to allowed (step 330). The method then determines whether the functionality is restricted or otherwise limited in any way in the protected area (step 340). If the functionality is restricted in the protected area, a checklist flag is set to restricted (step 350). The method then determines whether a specific combination of functionality is restricted (step 360). If the portable electronic device contains the specific combination of functionality, a checklist flag is set to restricted combination (step 370). The method then determines whether any items flagged as restricted or restricted combination have a confidence factor above a predetermined threshold (step 380). If yes, an alert flag is set for that portable electronic device (step 390). The method then exits or restarts for the next portable electronic device.

Although the present invention has been described with reference to the preferred embodiments, those skilled in the art will recognize that changes may be made in form and detail without departing from the scope of the invention.

What is claimed is:

1. A method in an apparatus for detecting the functionality of an electronic device, comprising:
   detecting a trigger from the electronic device wherein the electronic device is separate from the apparatus;
   identifying one or more functionalities of the electronic device based on the detected trigger;
   for each of the one or more functionalities, determining whether the functionality is permitted or restricted in a protected area; and
   in response to a determination that at least one of the one or more functionalities is restricted in the protected area, setting an alert flag indicating that the electronic device includes restricted functionality.

2. The method of claim 1, wherein the trigger is a chemical layer applied to the electronic device.

3. The method of claim 2, wherein the chemical layer is a coating applied to an antenna of the electronic device.

4. The method of claim 2, wherein the chemical layer is a coating applied to a retractable strip of the electronic device.

5. The method of claim 2, wherein the apparatus is a mass spectrometer.

6. The method of claim 1, wherein the trigger is an optical filter.

7. The method of claim 6, wherein the optical filter is integrated into an antenna of the portable electronic device.

8. The method of claim 1, wherein the trigger is an RF transmission.

9. The method of claim 1, wherein the trigger is a sound transmission outside of the range of human hearing.

10. The method of claim 1, wherein the trigger is a magnetic matrix identifier.

11. A method in an apparatus for detecting the functionality of an electronic device, comprising:
   activating a trigger provided on the electronic device to create a response, wherein the electronic device is separate from the apparatus;
   detecting the response of the activated trigger; and
   identifying one or more functionalities of the electronic device based on the detected response;
   for each of the one or more functionalities, determining whether the functionality is permitted or restricted in a protected area; and
   in response to a determination that at least one of the one or more functionalities is restricted in the protected area, setting an alert flag indicating that the electronic device includes restricted functionality.

12. The method of claim 11, wherein the trigger is a chemical layer applied to the electronic device.

13. The method of claim 12, wherein the chemical layer is a coating applied to an antenna of the electronic device.

14. The method of claim 11, wherein the chemical layer is a coating applied to a retractable strip of the electronic device.

15. The method of claim 12, wherein the apparatus is a mass spectrometer.

16. The method of claim 12, wherein the trigger is activated by emanating a chemical that is reactive with the trigger, causing a detectable chemical reaction.

17. The method of claim 16, wherein the detectable chemical reaction is a change in the heat signature of the chemical marker.

18. The method of claim 16, wherein the detectable chemical reaction is a color change in the chemical marker.

19. The method of claim 16, wherein the detectable chemical reaction releases a byproduct that is detectable by the apparatus.

20. The method of claim 11, wherein the trigger is an optical filter.

21. The method of claim 20, wherein the optical filter is integrated into an antenna of the portable electronic device.

22. The method of claim 20, wherein the apparatus detects the trigger by sensing light filtered through the optical filter.

23. The method of claim 11, wherein the trigger is an RF transmission.

24. The method of claim 11, wherein the trigger is a sound transmission outside of the range of human hearing.

25. The method of claim 11, wherein the trigger is a magnetic matrix identifier.

26. An apparatus for detecting the functionality of an electronic device, the apparatus comprising:
   an activator configured to activate the trigger of the electronic device, wherein the electronic device is separate from the apparatus and includes a trigger, the apparatus comprising:
   a sensor configured to:
      detect the activation of the trigger;
      identify one or more functionalities of the electronic device;
      for each of the one or more functionalities, determine whether the functionality is permitted or restricted in a protected area; and
      in response to a determination that at least one of the one or more functionalities is restricted in the protected area, set an alert flag indicating that the electronic device includes restricted functionality; and
   an interface configured to output the one or more functionalities of the electronic device.

27. The apparatus of claim 26, wherein the activator releases a chemical that reacts with the trigger producing a byproduct gas and the sensor detects the byproduct gas.

* * * * *